United States Patent
Roskind

(10) Patent No.: US 9,204,345 B1
(45) Date of Patent: Dec. 1, 2015

(54) SOCIALLY-AWARE CLOUD CONTROL OF NETWORK DEVICES

(75) Inventor: James Roskind, Redwood City, CA (US)

(73) Assignee: Google Inc., Mountain View, CA (US)

( * ) Notice: Subject to any disclaimer, the term of this patent is extended or adjusted under 35 U.S.C. 154(b) by 433 days.

(21) Appl. No.: 13/402,762

(22) Filed: Feb. 22, 2012

(51) Int. Cl.
| | |
|---|---|
| *H04W 36/00* | (2009.01) |
| *H04L 29/06* | (2006.01) |
| *H04W 84/12* | (2009.01) |
| *H04W 12/06* | (2009.01) |

(52) U.S. Cl.
CPC ......... *H04W 36/0083* (2013.01); *H04L 63/101* (2013.01); *H04W 12/06* (2013.01); *H04W 36/0022* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 7,617,317 B2 | 11/2009 | Jones et al. | |
| 7,734,283 B2 | 6/2010 | Sebban | |
| 7,899,019 B1 | 3/2011 | Evans et al. | |
| 7,924,780 B2 | 4/2011 | Waisman-Diamond | |
| 8,190,757 B1 * | 5/2012 | Davis et al. | 709/229 |
| 8,472,371 B1 * | 6/2013 | Bari et al. | 370/328 |
| 8,478,233 B2 * | 7/2013 | Liu et al. | 455/406 |
| 8,887,289 B1 * | 11/2014 | Hullale | 726/26 |
| 2003/0050976 A1 * | 3/2003 | Block et al. | 709/203 |
| 2004/0152463 A1 * | 8/2004 | Grootwassink | 455/432.3 |
| 2005/0059396 A1 | 3/2005 | Chuah et al. | |
| 2006/0161771 A1 * | 7/2006 | Zhang | 713/168 |
| 2006/0262752 A1 * | 11/2006 | Moore et al. | 370/331 |
| 2007/0226499 A1 * | 9/2007 | Zhang | 713/168 |
| 2009/0125521 A1 * | 5/2009 | Petty | 707/9 |
| 2009/0323636 A1 * | 12/2009 | Dillon et al. | 370/331 |
| 2011/0019607 A1 | 1/2011 | Beck et al. | |
| 2011/0167478 A1 | 7/2011 | Krishnaswamy et al. | |
| 2012/0110643 A1 * | 5/2012 | Schmidt et al. | 726/4 |
| 2012/0240197 A1 | 9/2012 | Tran et al. | |
| 2012/0311691 A1 | 12/2012 | Karlin et al. | |
| 2013/0117806 A1 | 5/2013 | Parthasarathy et al. | |

* cited by examiner

*Primary Examiner* — Ian M Moore
*Assistant Examiner* — Latresa McCallum
(74) *Attorney, Agent, or Firm* — McDermott Will & Emery LLP

(57) ABSTRACT

Methods, systems, and computer program products for socially-aware cloud-based control of a network device are disclosed. An embodiment includes operating the network gateway to provide, to a visitor, a first level of access to a network; determining at least one relationship between the visitor and an owner of the network gateway, wherein the relationship is determined between a cloud-based identity of the visitor and a cloud-based identity of the owner; and reconfiguring the network gateway to provide a second level of access to the network to the visitor, wherein the second level of service is based upon the determined at least one relationship.

17 Claims, 8 Drawing Sheets

SOCIALLY-AWARE CLOUD CONTROL OF NETWORK DEVICES

BACKGROUND

1. Field

This disclosure relates generally to configuration of network devices.

2. Background

Network gateways, such as WIFI routers, are now found in many households.

Network gateways used in personal environments, such as homes, are becoming increasingly sophisticated. Home network gateways provide WIFI and other network access and connectivity to nearby users (e.g., users located within the range of a home WIFI or Bluetooth network, and users connected to another type of home local area network) and implement firewall and monitoring policies. The complexity of network gateways continues to grow as their capabilities and the number of devices to which they provide network access keeps growing.

Users who own these network gateways have varied levels of skill with respect to controlling these devices, and often do not have the necessary knowledge and/or the inclination to perform the setup and configuration recommended for the devices. Improper configuration or management of these gateways can lead to poor user experiences, poor quality of service of the various network services made available through the gateway, and security and other risks associated with unauthorized access to the gateway or the associated network connections.

It is often the case that users other than the owner of these network gateways have a need to access the home network or a remote network through the home network gateway. However, conventional approaches that allow users other than the owner (referred to herein as "visiting users" or "visitors") to access networks through the network gateway requires that the owner provides the visitor with a key and the visitor goes through the tedious process of manually configuring the keys on the visitor's client device in order to access the network gateway. All users, including the owner, who access the network use the same keys, and no differentiation is generally made in the service provided by the network gateway based on user identity. In order to prevent a user who has previously accessed the home network from accessing the network again, the password of the network is changed. Such changes in the password can cause additional configurations changes causing numerous devices to be reconfigured.

Moreover, when multiple users are accessing networks through the same network gateway, conventional approaches do not offer a convenient mechanism by which users can be differentiated in order to provide different qualities of service.

The burdens placed upon the owner and visitor to manually configure passwords or keys in order to allow the visitor access to the network gateway are tedious and can be improved. Moreover, a capability to configure different levels of service based upon visitor identity may be desired.

SUMMARY

Methods, systems, and computer program products for socially-aware cloud-based control of a network device are disclosed. An embodiment includes operating the network gateway to provide, to a visitor, a first level of access to a network; determining at least one relationship between the visitor and an owner of the network gateway, wherein the relationship is determined between a cloud-based identity of the visitor and a cloud-based identity of the owner; and reconfiguring the network gateway to provide a second level of access to the network to the visitor, wherein the second level of service is based upon the determined at least one relationship.

A second embodiment includes a network gateway that comprises a processor, a downlink network interface communicatively coupled to the processor and configured to access a home network, an uplink network interface communicatively coupled to the processor and configured to directly or indirectly access a remote network, a visitor detection module, and one or more configuration modules. The visitor detection module is configured to be executed by the processor and to detect an access by a visitor through the network device to a cloud-based service. The one or more configuration modules are configured to be executed by the processor and to configure the network device to provide network access to the visitor, wherein the network device is configured based upon instructions received from a cloud-based configuration controller, and wherein the instructions are responsive to the detected access.

A third embodiment includes a computer program product having a computer readable storage medium having computer program logic recorded thereon that, when executed by a processor, enables the processor to configure a network device. The computer program logic includes a first logic module to detect an access by a visitor through the network device to a cloud-based service; and a second logic module to configure the network device to provide services to the visitor, wherein the network device is configured based upon instructions received from a cloud-based configuration controller, and wherein the instructions are responsive to the detected access.

A fourth embodiment includes a cloud-based configuration controller having a processor, a visitor configuration request receiving module, a visitor identity module, and a visitor configuration generation module. The visitor configuration request receiving module is configured to receive a visitor configuration request from a network device, wherein the visitor configuration request includes access information pertaining to an access made by a visitor to a cloud-based service. The visitor identity module is configured to determine a cloud-based identity of the visitor based upon the received access information, and to associate the determined cloud-based identity of the visitor with a visitor identity configuration. The visitor configuration generation module is configured to form one or more instructions to configure the network device to provide access to the visitor based upon the visitor identity configuration.

A fifth embodiment includes computer program product having a computer readable medium that has computer program logic recorded thereon that, when executed by a processor, enables the processor to configure a network device. The computer program logic includes a first logic module to detect an access by a visitor through the network device to a cloud-based service, and a second logic module to configure the network device to provide services to the visitor, wherein the network device is configured based upon instructions received from a cloud-based configuration controller, and wherein the instructions are responsive to the detected access.

Further features and advantages of the embodiments, as well as the structure and operation of various embodiments thereof, are described in detail below with reference to the accompanying drawings. It is noted that this disclosure is not limited to the specific embodiments described herein. Such embodiments are presented herein for illustrative purposes only. Additional embodiments will be apparent to persons skilled in the relevant art(s) based on the teachings contained in this disclosure.

BRIEF DESCRIPTION OF THE DRAWINGS/FIGURES

Reference will be made to embodiments, examples of which may be illustrated in the accompanying figures. These figures are intended to be illustrative, not limiting. Although the invention is generally described in the context of these embodiments, it should be understood that it is not intended to limit the scope of the disclosure to these particular embodiments.

DETAILED DESCRIPTION

While the disclosure refers to illustrative embodiments for particular applications, it should be understood that the disclosure is not limited thereto. Those skilled in the art with access to this disclosure will recognize additional modifications, applications, and embodiments within the scope of this disclosure and additional fields in which the disclosed examples could be applied.

Embodiments disclosed herein may be used in cloud-based control of a network device, where the control may be based upon social relationships of the owner of the network device. The controlled network devices can include, but are not limited to, network gateways such as home network gateways and wireless routers. The cloud-based identity of the user may be used to represent the owner. According to some embodiments, an authenticated cloud-based identity of a user is automatically associated with the ownership of a network device in the user's home, and thereby the user is allowed to control the network device using his cloud-based identity. The owner's cloud-based identifier can be automatically discovered and applied to the ownership of a network device, thereby reducing the amount of manual configuration that is required. Moreover, by associating a cloud-based identity with the ownership and control of the network device, functions such as reliable authentication of access and delegation of control of the network device are enabled. Methods, systems, and computer program products for cloud-based adaptive ownership of network devices are disclosed in U.S. patent application Ser. No. 13/460,707 titled "Adaptive Ownership and Cloud-based Control of Network Devices" naming James Roskind and Wan-Teh Chang as inventors, which is hereby incorporated by reference in its entirety.

Figure 1:
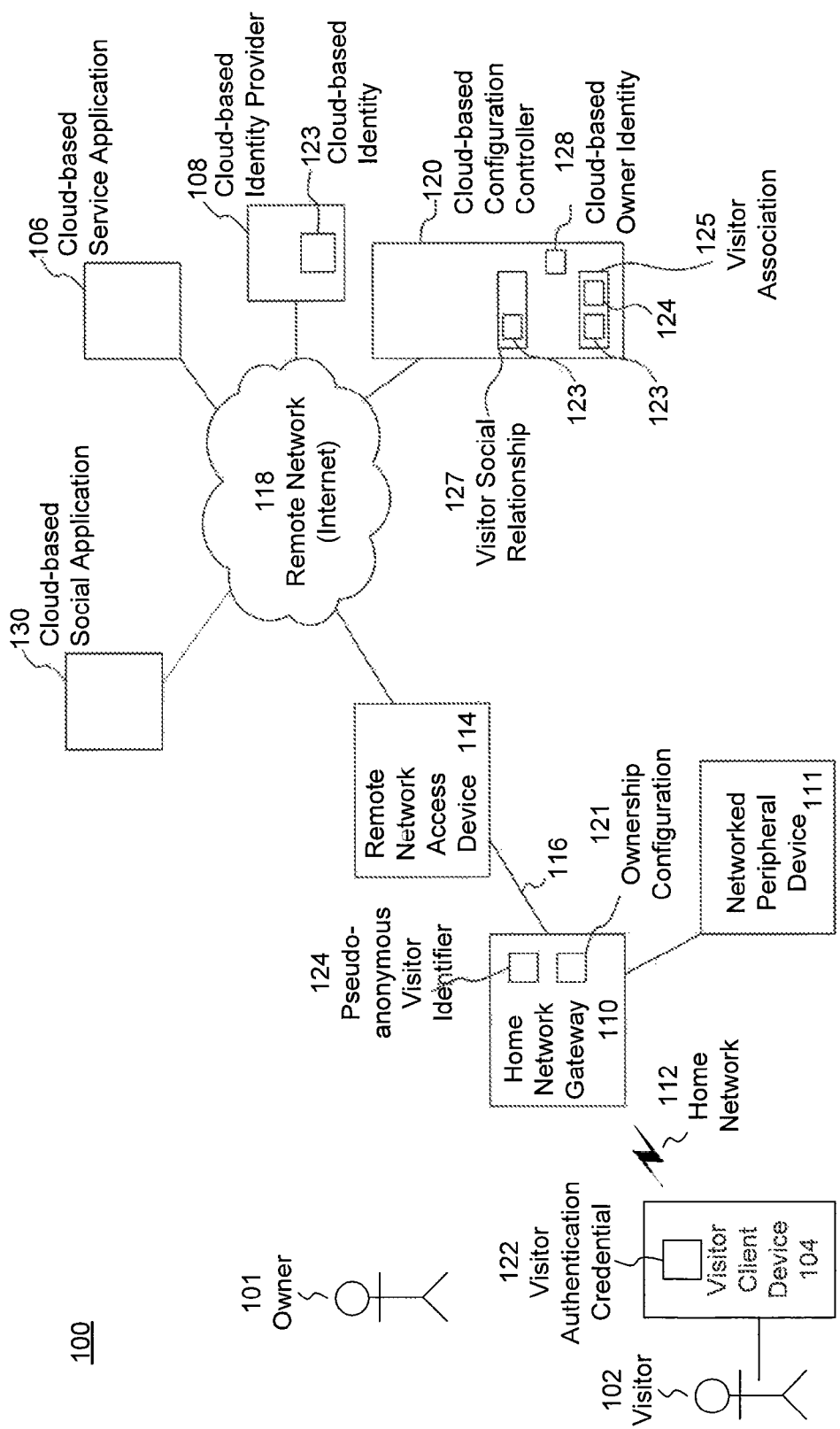
FIG. 1 illustrates a system for socially-aware cloud-based control of network devices, according to an embodiment.

FIG. 1 illustrates a system 100 for socially-aware cloud-based control of network devices in accordance with an embodiment. System 100 comprises a visitor client device 104, cloud-based service application 106, cloud-based identity provider 108, a network gateway 110, one or more networked peripheral devices 111, Internet access device 114, a cloud-based configuration controller 120, and a cloud-based social application 130.

A visiting user 102 ("visitor") accesses a cloud-based service application 106 using visitor client device 104. Visitor client device 104 connects to remote network 118 through a network gateway 110. Visitor client device 104 may initially connect to network gateway 110 before the latter is configured to control access for visitor 102. Cloud-based identity provider 108 authenticates the access by visitor 102 to cloud-based service application 106. System 100 automatically detects the authentication of visitor 102 by cloud-based service application 106 and the resulting determination of a cloud-based visitor identity 123 of visitor 102. System 100, based upon the determined cloud-based visitor identity 123, configures network gateway 110 to control access provided to visitor 102. The control of access may be based upon social relationships discovered between an owner 101 of network gateway 110, as represented by a cloud-based owner identity 128, and a cloud-based visitor identity 123 of visitor 102.

The term "owner" is used herein to refer to the person or entity that owns the network gateway. The network gateway itself may not be aware of the actual identity of its owner, and may only be aware of an authenticated identity (possibly pseudo-anonymous) generated by a cloud-based identity provider. The owner is provided with authenticated access to that network gateway and is authorized to perform administrative operations. Administrative operations may include configuring network interfaces, configuring access to the network to other users, configuring firewall rules, configuring address assignments, and the like. There may be one or more users, including the owner, who are capable of performing administrative operations on the network device. Such users are referred to herein as "privileged users."

As used herein, a "visitor" or "visiting user" is any user who is not the owner of the network gateway. A visitor, for example, may be a family member of the owner or other person who regularly uses network gateway 110 and home network 112. A visitor may also include any other user who may access network gateway 110 occasionally.

Visitor client device 104 can be any computing device (e.g., server, personal computer, laptop computer, netbook computer, tablet computer, personal digital assistant), a smart phone, MP3 player, set top box, or other device using which the visitor can initiate an access to a remote network 118, such as the Internet or other wide area network (WAN).

Cloud-based service application 106 can be any application which requires authentication for access. Web-based email provider applications (e.g., GMAIL, YAHOO MAIL) and web-based personal portals (e.g., IGOOGLE, MY YAHOO) are examples of cloud-based service application 106. Cloud-based service application 106 requires that the user is authenticated, for example, by providing a user identifier and a password, in order for the user to be allowed access to the provided service. For example, visitor 102 may use user credentials 122 (e.g., user identifier and password) to log in to a web-based email service. Cloud-based service application 106 may be executed on one or more servers and connected to remote network 118.

Cloud-based identity provider 108 provides a cloud-based identity for registered users. A user, such as visitor 102, may have a pre-existing cloud-based visitor identity 123 provided by cloud-based identity provider 108. When visitor 102 attempts to access a service, such as cloud-based service application 106, cloud-based identity provider 108 may authenticate visitor 102 based on user credentials 122 that are provided. When authenticated by cloud-based identity provider 108, logged in visitor 102 is represented within system 100 as cloud-based visitor identity 123. Exemplary cloud-based identity providers include Google, Yahoo, Microsoft, United States Post Office, Credit Card Companies, email service providers, financial institutions and the like that provide identity and authentication of users for many cloud-based applications.

Network gateway 110 provides an interface (not shown) to local network 112 through which clients, such as visitor client device 104, and other user devices, such as networked peripheral devices 111, connect to a remote network 118 and/or to each other. Networked peripheral devices 111 can include one or more computers, entertainment platforms, communications platforms, printers, storage devices, household appliances, or other network-connected devices. Local network 112 may include one or more of WIFI, Bluetooth, Ethernet, or other wireless or wireless local area network (LAN). Network gateway 110 may include one or more interfaces (not shown) to local networks such as network 112. Network gateway 110 forwards packets to and from devices on the local networks towards one or more remote networks (e.g., network 118). Network gateway 110 provides a primary point of control of a user's connectivity to networks, such as network 118. In addition to providing local area network connectivity (e.g., wireless access point) and forwarding to packets to/from devices on the local area network 112, network gateway 110 may implement firewalls for intrusion detection and to allow or to deny connections to or from any of the devices, such as device 111, on local area network 112. Network gateway 110 can also implement capabilities to authorize and/or enable remote access to any of the peripheral devices, such as 111, in local network 112.

Network gateway 110 may be directly coupled to the remote network 118 (through a provider network) or it may be indirectly connected via a network link 116 to a separate remote network access device 114 (e.g., digital subscriber line (DSL) modem, cable modem) which in turn connects to remote network 118. Network gateway 110 can include access to remote network 118 through a third or fourth generation (3G or 4G) wireless network.

One or more of the embodiments are directed at controlling network gateway 110 through a cloud-based service such as cloud-based configuration controller 120 in order to provide network access to a visitor 102 based upon the social relationships between visitor 102 and owner 101.

Cloud-based configuration controller 120 operates to enable visitor 102 to access and to use devices including network gateway 110. Cloud-based configuration controller 120 can establish an association between a cloud-based identity, such as cloud-based visitor identity 123, of visitor 102 and a visitor identifier 124 configured on network gateway 110. Network gateway 110 can be configured by setting up a pseudo-anonymous identifier as the identifier for the visitor to whom access is to be provided. Visitor identifier 124, for example, may be a pseudo-anonymous identifier which has no relationship, other than an association, such as visitor association 125, maintained by cloud-based configuration controller 120 to an identity of visitor 102. Subsequently, cloud-based configuration controller 120 enables owner 101 to automatically or manually control and manage network gateway 110 to enable visitor 102 to access cloud-based service applications, such as service application 106.

Cloud-based social application 130 can be any application, implemented in the cloud, in which relationships among users can be ascertained. Examples of cloud-based social application 130 include, but are not limited to, email applications, chat applications, photo sharing applications, file sharing applications, music and other multimedia sharing applications, calendaring applications, event management applications, communications applications, and other social applications that enable interaction between users. Further examples include GOOGLE+, FACEBOOK, MYSPACE, TWITTER, LINKEDIN, SKYPE, and the like. In embodiments, cloud-based social application is used in determining one or more relationships between owner 101 of network device 110, and visitor 102. A person of skill in the art would appreciate that cloud-based services 130, 106, 108 may or may not be implemented as a unified service.

Figure 2:
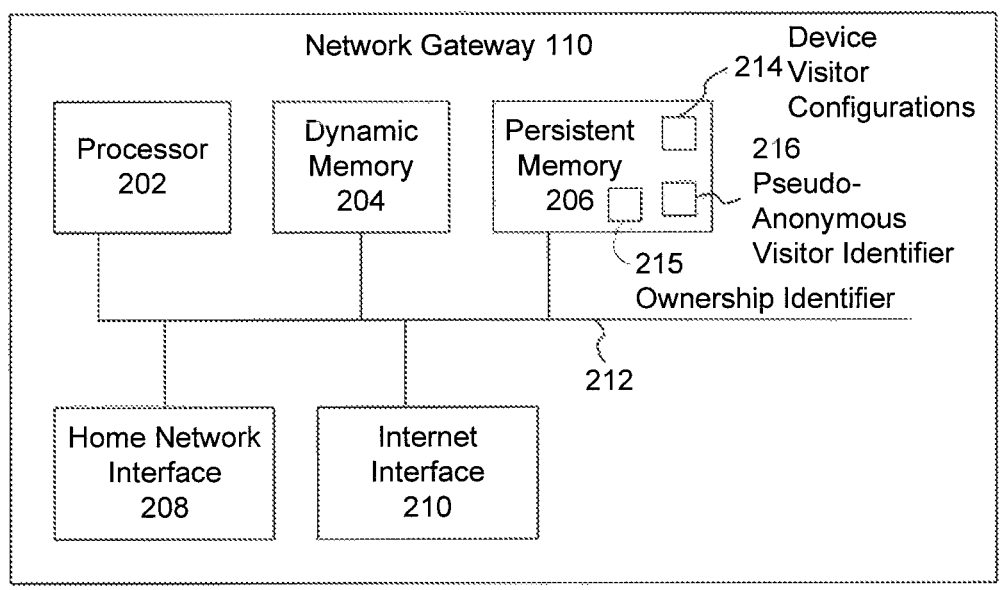
FIG. 2 illustrates a block diagram of a network device in accordance with an embodiment.

FIG. 2 illustrates a block diagram of a network gateway device 110 in accordance with an embodiment. Network gateway 110 includes a processor 202, a volatile memory 204, a persistent memory 206, one or more local network interfaces 208, one or more remote network interfaces 210, and an interconnection infrastructure 212. Processor 202 can be a processor, such as, but not limited to, a microprocessor, field programmable gate array (FPGA), or digital signal processor (DSP). Volatile memory 204 can include a random access memory (RAM) or like memory. Persistent memory 206 can include a persistent data storage medium such as a hard-disk or flash-memory storage device. Device visitor configurations 214, which include configuration parameters of network gateway 110 regarding access provided to visitors, may be stored in persistent memory 206. Ownership identifier 215 and visitor identifier 216 of network gateway 110 may also be stored in persistent memory 206. Communications infrastructure 212 operates to communicatively couple modules of network device 110. According to an embodiment, communications infrastructure comprises at least one communications bus.

Local network interface 208 communicatively couples client devices (such as visitor client device 104 through which visitor 102 accesses remote network 118), various input/output devices, computing and/or entertainment platforms, and the like, to network gateway 110. For example, visitor client device 104 may be coupled to home network 112 and to through local network interface 208. Network interface 208 can comprise one or more interfaces to wired or wireless networks such as Wi-Fi, Bluetooth, or Ethernet network.

Remote network interface 210 operates to provide connectivity to a remote network 118 to network gateway 110 and to any device connected to network gateway 110 through local network interface 208. According to an embodiment, remote network interface 210 is directly connected to a provider network (not shown) through which remote network 118 is reached. In another embodiment remote network interface 210 is connected to an internet access device or provider network access device, such as network access device 114, which is in turn connected to remote network 118. In yet another embodiment, remote network interface 210 may include a cellular internet connection.

Figure 3:
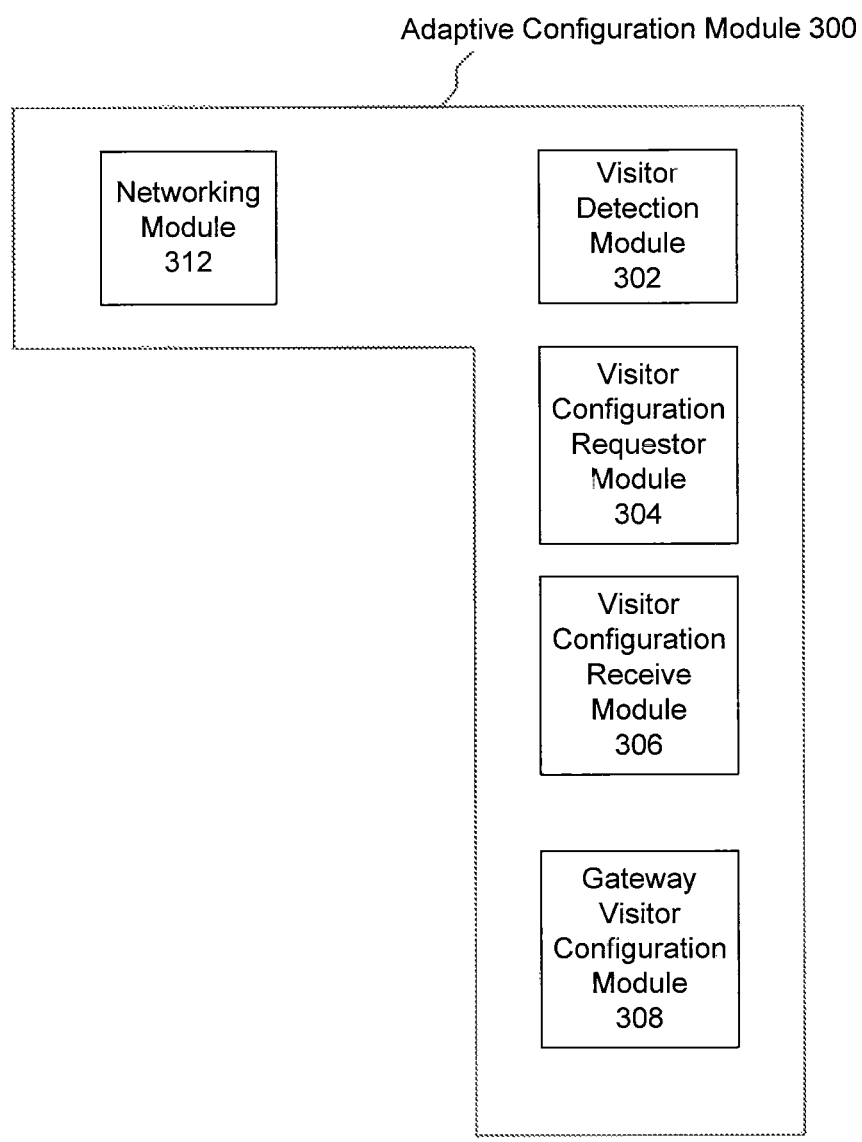
FIG. 3 illustrates a socially-aware control module that can be implemented in a network device in accordance with an embodiment.

FIG. 3 illustrates a socially-aware control module 300 that can be implemented in network gateway 110 in accordance with an embodiment. Socially-aware network gateway control module 300 comprises a visitor detection module 302, a visitor configuration requester module 304, a visitor configuration receiver module 306, and a gateway visitor configuration module 308. Processor 202 of network gateway 110 can, for example, execute socially-aware network gateway control module 300. In embodiments, socially-aware network gateway control module 300 can be implemented in software, firmware, hardware, or a combination thereof Visitor detection module 302 operates to detect the presence of a user nearby the network gateway. Network gateway 110 may detect visitor 102 or visitor client device 104 based upon, for example, detecting visitor 102 or visitor client device 104 over local area network 112. For example, the establishment of a physical layer and/or link layer connection between local network interface 208 and visitor client device 104 may be interpreted as the detection of a nearby user. In WIFI and Bluetooth networks, for example, a connection between nodes is established prior to network layer packets being transmitted. In another embodiment, a user may be detected based upon the detection of a new address in the local area network 112. For example, when local area network 112 is an Ethernet, the presence of visitor client device 104 on the Ethernet 112 can be detected based upon the detection of a new physical layer or MAC layer address in that network. According to another embodiment, a nearby visitor client device 104 can be detected by network gateway 110 based upon requests for network layer addresses. For example, when network gateway 110 is implementing a dynamic host configuration protocol (DHCP) server (not shown), visitor client device 114 would request an Internet Protocol (IP) address for its use from network gateway 110.

Moreover, visitor detection module 302 can operate to detect a connection by visitor 102 and/or visitor client device 104 to a cloud-based application service 106 through network gateway 110. For example, visitor detection module 302 can monitor communications from visitor client device 104 to a cloud-based service application for which an address has been configured in network gateway 110. Device configurations 214, for example, can include one or more addresses of cloud-based application services for which communications through network gateway 110 can be monitored. According to an embodiment, the monitoring may be based upon detecting HTTP protocol messages to the uniform resource locators (URLs) of the servers providing the respective cloud-based service applications.

Visitor detection module 302 can further operate to detect a login and/or other authentication of visitor 102 by cloud-based service application 106. Visitor detection module 302 can detect login events and/or other authentication events by visitor 102 and/or client 104 based on any of several techniques. According to one embodiment, the traffic between client 104 and cloud-based server application 106 can be monitored for HTTP authentication requests and HTTP response messages indicating successful authentication. Detection based upon plaintext HTTP is possible, for example, when encryption is not being used for exchanges from the client 104 to cloud-based service application 106, or when a web proxy (not shown) is implemented in network gateway device 110 where the web proxy intercepts the packets from client 104 to cloud-based service application 106. According to another embodiment, the setup of a HTTP secure socket layer (SSL) connection or other HTTPS (secure HTTP) may be detected by visitor detection module 302 as a login or other authentication of the visitor by cloud-based service application 106.

In another embodiment, visitor detection module 302 may operate to request client 104 for one or more user credentials. For example, upon detection of a connection through network gateway 110 from client 104 to cloud-based service application 106, visitor detection module 302 may request and receive one or more user credentials of visitor 102 from client 104. The request may be implemented, for example, via an HTTP proxy at network gateway 110.

The above described techniques for detecting a connection through network gateway 110 by visitor 102 or client 104, and techniques for detecting login or authentication of visitor 102, are exemplary, and a person skilled in the art would appreciate that other techniques may be used for such detection.

Visitor configuration requester module 304 operates to request configuration for visitor access to network gateway 110 from a cloud-based configuration controller. According to an embodiment, visitor configuration requester module 304 determines that network gateway 110 requires configuration to enable access to visitor 102, and creates a configuration request message (not shown) to be sent to cloud-based configuration controller 120. The configuration request message includes information based on which a cloud-based identity provider 108 can find a cloud-based identity of visitor 102. For example, in one embodiment, the configuration request message can include one or more user login credentials that visitor 102 provided in order to login to cloud-based service application 106.

According to another embodiment, the configuration request message includes an identifier, such as a pubic IP address (Internet Protocol address) of the network gateway 110, by which cloud-based identity provider 108 and cloud-based service application 106 can relate network gateway 110 to a recent authentication by visitor 102. For example, where network 112 is not a network in which public IP addresses are used, a request for authentication which is originated by visitor client device 104 and received at cloud-base service application 106 will have the public IP address of network gateway 110 as its source IP address. According to an embodiment, the source IP address associated with the request for authentication received from visitor client device 104 (i.e. client device associated with visitor 102) can be matched to the public IP address of the network gateway 110 as specified in a configuration request. If a match exists, then the corresponding authentication and user is associated with the network gateway 110, which in turn enables relating a cloud-based identity of the visitor to the ownership of network gateway 110.

According to yet another embodiment, network gateway 110 can detect a request for authentication sent by client device 104, and can encapsulate the detected request for authentication in a tunnel such as a SSL tunnel to cloud-based service application 106. One or more of cloud-based social application 130, cloud-based service application 106, cloud-base identity provider 108 or cloud-based configuration controller 120, can then associate the source of the tunnel (network gateway 110) with the request for authentication (originated by visitor 102) encapsulated in the tunnel. A request for configuration for network gateway 110 can be included with the encapsulated request for authentication.

Visitor configuration receiver module 306 operates to receive configuration from a cloud-based configuration controller. According to an embodiment, in response to a request from visitor configuration requester module 304, cloud-based configuration controller 120 sends visitor configuration for network gateway 110.

Gateway configuration module 308 operates to configure the network gateway. The configurations received from cloud-based configuration controller 120 are implemented on network gateway 110 by gateway configuration module 308. According to an embodiment, as described above, configurations implemented on network gateway 110 include the configuration of the visitor pseudo-anonymous identifier 124 as a visitor to whom access is provided through network gateway 110.

Network module 312 operates to provide network capabilities to network gateway 110. Network capabilities can include, but are not limited to, implementing of network interfaces such as an interface to home network 112 and an interface to network 116 to link to an external network. Network capabilities can further include address assignment such as a DHCP server, SSL or other tunnel encoding/decoding, network address translation, and the like.

Figure 4:
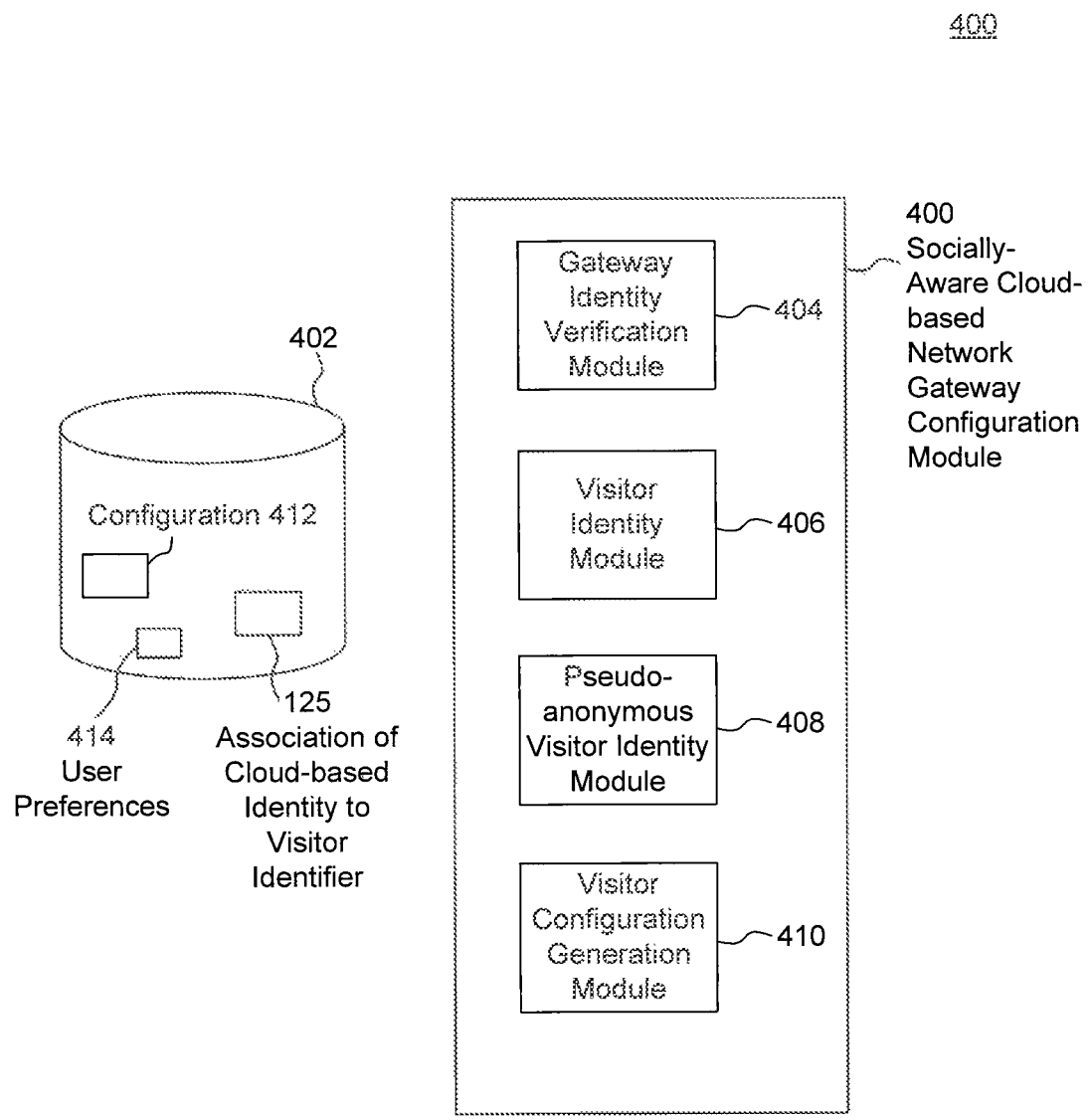
FIG. 4 illustrates a socially-aware cloud-based configuration controller in accordance with an embodiment.

FIG. 4 illustrates a socially-aware cloud-based network gateway configuration module 400 in accordance with an embodiment. Module 400 can be implemented, for example, in cloud-based configuration controller 120 in order to provide configuration to network devices such as network device 110. According to another embodiment, module 400 is implemented in a combination of two or more of cloud-based configuration controller 120, cloud-based identity provider 108, cloud-based service application 106, and cloud-based social application 130. Module 400 includes a configuration database 402, a gateway identity verification module 404, a visitor identity module 406, a pseudo-anonymous visitor identity module 408, and a visitor configuration generation module 410.

Configuration database 402 comprises stored information including configuration information 412 for network gateways such as network gateway 110. Configuration information 412 may include a configuration profile and/or configuration instructions for configuring network gateway 110. Configuration database 402 also includes user associations, such as visitor associations 125, that define a binding between a visitor's cloud-based identity and a visitor identity with which one or more network gateways 110 have been configured.

Gateway identity verification module 404 operates to determine the identity of the network gateway 110 that is to be configured. Network gateway 110 can be uniquely identified by its IP address such as the public IP address used to represent it to remote networks. When a configuration request associating visitor 102 or visitor client device 104 with network device 110 is received at cloud-based configuration controller 120, gateway identity verification module 404 may operate to verify that the visitor and/or client are actually associated with the network device. According to an embodiment, verification can be based upon comparing the source address in the configuration request with the source address used by client 104 in authenticating with a cloud-based service application 106.

Visitor identity module 406 operates to determine a cloud-based identity for a visitor, such as visitor 102, for whom the access privileges of network gateway 110 are to be configured. According to an embodiment, visitor identity module 406 determines a visitor's cloud-based identity based upon one or more credentials of the visitor which are obtained by network gateway 110. According to another embodiment, the visitor's cloud-based identity is determined using information that only indirectly relates to the visitor. For example, visitor identity module 406 may use the public IP address of a network gateway to determine, through a cloud-based service application 106 and/or cloud-based identity provider 108, a cloud-based identity of user 102 who accesses cloud-based service application 106 from the same public IP address.

Pseudo-anonymous visitor identity module 408 operates to create and manage a visitor identity which is to be configured in network gateway 110. The visitor identity is the identity of the visitor as known to, and/or as stored on, network gateway 110. According to an embodiment, the visitor identity is pseudo-anonymous, wherein there is no information in the visitor identity, from which the actual identity of the visitor can be determined (by the Gateway). According to an embodiment, the cloud-based identity of a visitor is related to visitor identity only through a visitor association 125. Visitor association 125 may be stored in the cloud, for example, in cloud-based configuration controller 120, and may or may not be stored in the network gateway 110.

Visitor configuration generation module 410 operates to generate the configuration that is to be implemented in network gateway 110. According to an embodiment, the generated configuration is based upon characteristics of network gateway 110 and any preconfigured preferences (such as user preferences 414) of owner 101. User configuration preferences 414 may be obtained and stored by cloud-based configuration module 120 and respective cloud-based identifiers can be associated with the stored preferences 414. The preconfigured preferences 414 may include such configurations as the levels of service to be offered to visitors based on respective relationship categories to which they belong. These preferences may also be referred to as configuration profiles. In some embodiments, the generated configuration for the visitor may be based also upon any requests and/or preferences of the visitor. For example, a visitor may request an unsecured wireless connection, or a particular level of bandwidth.

A visitor who is determined to belong to two or more categories of relationships with the owner of the network gateway, may have configured access privileges and restrictions that are a combination of the respective configurations corresponding to the two or more categories of relationships. The combination may be based upon the set of privileges and/or restrictions that are common to the respective relationship categories. According to another embodiment, the combination may include privileges and/or restrictions of each of the categories of relationships associated with the visitor.

The various logic modules illustrated in FIGS. 1-4 can be implemented in software, firmware, hardware, or a combination thereof. In an embodiment, one or more of the modules are implemented in the C++, C, and Java programming languages. In one embodiment, a computer program product may have logic including the computer program logic of the modules recorded on a computer readable medium such as a hard disk, flash disk, or other form of storage medium. According to an embodiment, the modules implemented in software execute on processor 202 and utilize volatile memory 204 for temporary storage of data and instructions. Persistent memory 206 may be used for additional temporary storage during the execution of the modules.

Figure 5:
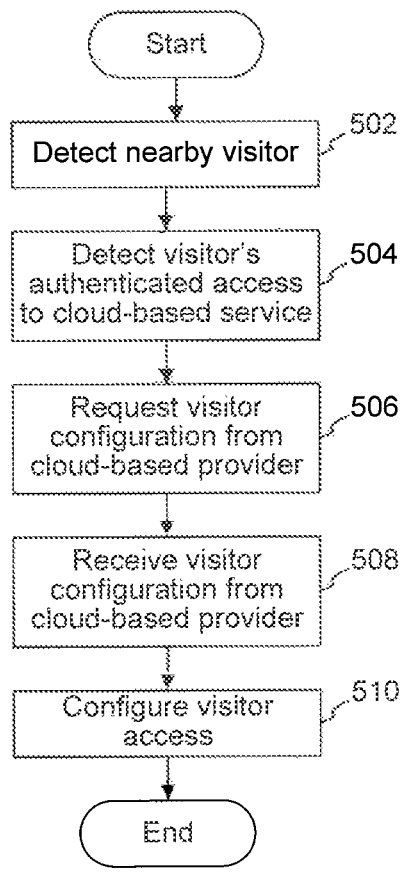
FIG. 5 illustrates a flowchart of a method of configuring a network device in accordance with an embodiment.

FIG. 5 illustrates a method 500 for controlling a network gateway to provide access to a visitor in accordance with an embodiment. Method 500 can be performed, for example, in network gateway 110 by socially-aware control module 300. Method 500 can be used to automatically associate a nearby visitor with the owner of a network gateway and to provide access for the visitor to various network resources through the network gateway. Method 500 may not occur in the order shown, or require all of the steps.

In step 502, a nearby visitor is detected. According to an embodiment, a visitor client device 104 is detected as being connected to a local network 114 of network gateway 110. Visitor client device 104 may be detected on the basis of its detection by network gateway 110 as a nearby device with a Bluetooth interface. Visitor client device 104 may also be detected when it forms a link layer association with a WM access point in network gateway 110. Yet another method of detecting a nearby visitor can be based upon the packets or frames that are detected on a local wired network. Another method for detecting a nearby visitor client device 104 at a network gateway 110 can be based upon an address allocator (e.g. DHCP server) for local network 114 being located in gateway 110.

After detecting the visitor, method 500 proceeds to step 504 in which an access by the visitor to a cloud-based service application is detected. The network gateway can monitor packets and/or connections that are forwarded through it to detect traffic (e.g., packets and/or connections) that are to a destination IP address or to a destination URL that is listed in a preconfigured list of destinations. Therefore, the traffic through the network gateway can be monitored for packets between a nearby user or the client through which the nearby visitor is connected to the local network and a remote destination which is listed in a preconfigured list. According to an embodiment, upon initial connection to network gateway 110, a visitor client device 104 may be provided with an interface, such as a graphical user interface, which prompts the user to proceed to login to any of a group of cloud-based service applications.

The network gateway may detect a login or other authentication of the visitor by a cloud-based service application to which the visitor connects through the network gateway. An authentication of the visitor may be detected based upon detected message exchanges, such as, HTTP authentication required and response messages. According to another embodiment, the setting up of a SSL connection from the client of the visitor to a selected destination is considered an authentication of the visitor. According to yet another embodiment, a proxy server may be implemented in the network gateway. The proxy server would intercept messages between the user and the cloud-based service application, and perform any changes required for addressing etc. The proxy server may be used in detecting authentication requests and responses.

In step 506, the network gateway requests visitor configuration from a cloud-based configuration controller. The request comprises an identification of the network gateway and an indication of the visitor for whom access to the network gateway is to be granted. The identification of the network gateway may include a public IP address of the network gateway. The identification of the network gateway may also include an identifier such as the serial number, or demonstrated possession of cryptographic material such as a private key.

The indication of the visitor may include information that can be used by a cloud-based entity to directly or indirectly relate the user to a cloud-based identity. Example indications of the visitor can include one or more user credentials such as a username and/or password, or a public key (e.g., public PKI key) of the visitor.

According to some embodiments, the indication of the visitor may be some information that indirectly relates to the visitor. For example, the public IP address and port of the network gateway can be considered as an indication of the visitor who has connected to a cloud-based service application through network gateway. The information included in the configuration request can be used by cloud-based configuration controller and other cloud-based services to associate an authenticated visitor with the network gateway by establishing that the network gateway is an intermediary in the trusted path between the user and an authenticated cloud-based service.

In step 508, in response to its visitor configuration request, the network gateway receives visitor configuration from the cloud-based configuration controller. The received visitor configuration may be in the form of one or more instructions to be executed in the network gateway, or in the form of a binary executable that can be loaded in the network gateway. The received configuration includes ownership configuration for the network gateway. The received configuration can also include configurations for other configuration parameters. Exemplary configuration parameters include status and operational parameters of respective network interfaces. The configuration may be received over a secure communications path established between the cloud-based configuration controller and the network gateway. For example, a secure communications path may be established by the configuration controller encrypting the configuration using the public key of the network gateway, and the network gateway decrypting the encrypted configuration using a private key, such as a private key which is configured in the device at the time of manufacture, or a private key for which the public key is or was known to, or can be verified by, the cloud-based configuration controller.

In step 510, one or more visitor configuration parameters in the network gateway are configured. The one or more visitor configuration parameters are configured to implement or activate the visitor configuration specified in the configuration received from the cloud-based configuration controller. According to an embodiment, the visitor configuration parameters in the network gateway can be set to a pseudo-anonymous visitor identifier that is specified by the cloud-based configuration controller. According to an embodiment, no information that can directly identify the visitor is provided from the cloud-based configuration controller to the network gateway. In such an embodiment, the association between the visitor identifier and the visitor's cloud-based identity is maintained at the cloud-based configuration controller and is not sent or downloaded to the network gateway.

Visitor configurations can include associating one or more MAC addresses, for example, the MAC address of client device 104 used by visitor 102, for which access is enabled and one or more rules in the firewall (and/or an access control list) in network gateway 110. The rules in the firewall and/or an access control list may specify, for example, for the MAC addresses associated with visitor 102, what networks or network locations are accessible, what network locations are specifically prevented from access, a maximum quality of service (e.g., bandwidth) to be offered, whether logging or monitoring is enabled, what local network resources are accessible, whether periodic authentication of the user is required, and whether multiple users are allowed from the same MAC address. Configurations may also specify whether the visitor should access the network gateway through an encrypted connection and if so how the encrypted connection is to be established. For example, according to an embodiment, if an encrypted connection is to be established, a copy of a shared encryption key for accessing home network 112 or network gateway 110 using an encrypted connection may be transferred from network gateway 110 to client device 104 using a message including the shared key, where the message is encrypted using the public key of the client device 104. The client device 104 can recover the shared key from the message by decrypting the massage using the corresponding private key, and using the shared key to encrypt its communications through network gateway 110.

Figure 6:
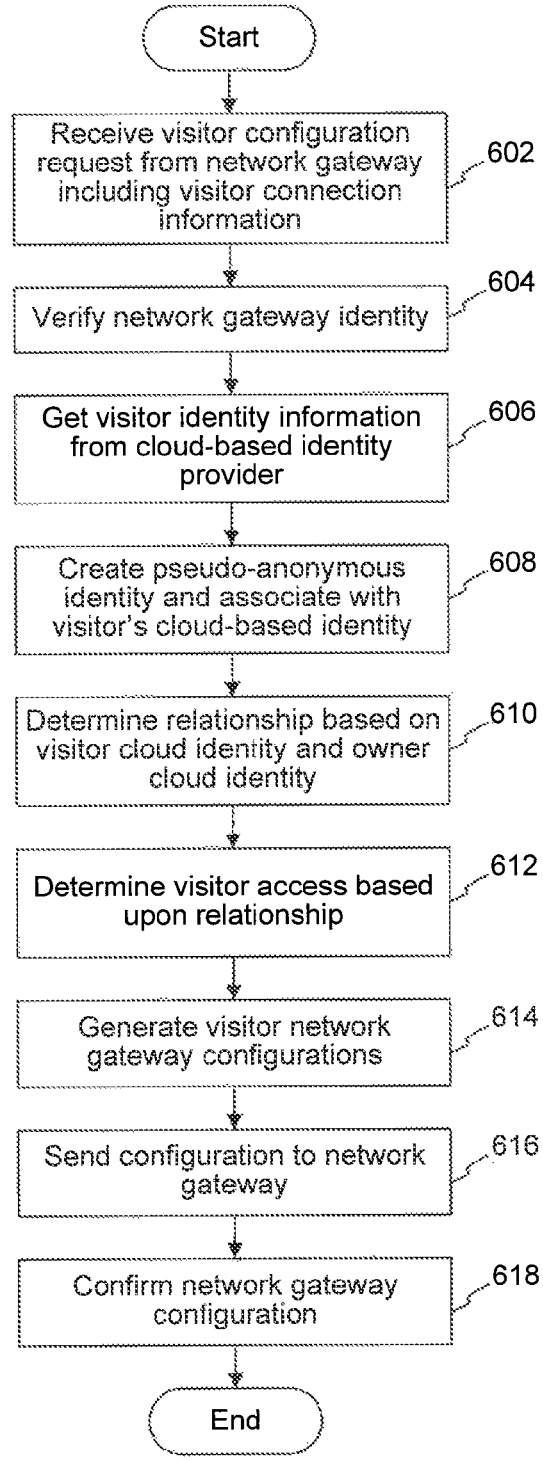
FIG. 6 illustrates a flowchart of a method of providing socially-aware cloud-based control of a network device in accordance with an embodiment.

FIG. 6 illustrates a flowchart of a method 600 (steps 602-618) of providing socially-aware control of a network gateway in accordance with an embodiment. Method 600 can be performed by a cloud-based configuration controller 120 to configure and control a network gateway 110. Method 600 may not occur in the order shown, or require all of the steps.

In step 602, a visitor configuration request is received from the network gateway requesting configuration. As described above, the configuration request includes an identification of the network gateway, for example, in the form of a public IP address. The identification of the network gateway can also include other information such as the serial number of the network gateway and/or the type of network gateway.

The configuration request also includes an indication of a nearby visitor. The nearby visitor can be a user who is connected to the network gateway through one of the gateway's local network interfaces. The nearby visitor may be selected by the network gateway based on a communication between the nearby visitor (or a client through which the nearby visitor is connected to the network gateway) and a cloud-based service application via the network gateway. For example, the nearby visitor may be a user who uses network gateway 110 to access a cloud-based service application 106.

In step 604, the identity of the network gateway can be verified. The verification can be based upon checking that any IP address provided as the IP address of the network gateway is reachable and not in a disallowed list. If a serial number of the network gateway is provided, the verification can also include checks to ensure that the serial number is valid. Similar checks can be performed to ensure that the type of the network gateway is supported by the cloud-based configuration controller.

In step 606, the cloud-based visitor identity corresponding to the visitor information provided in the configuration request is determined. How the cloud-based visitor identity is determined can differ based upon the indication of the nearby visitor that is included in the configuration request. The cloud-based configuration controller uses one or more of the indications of the visitor provided in the configuration request to determine a cloud-based identity associated with the visitor.

If one or more user credentials of the visitor, such as login username, is provided in the configuration request, the cloud-based configuration controller uses the provided one or more credentials to query a cloud-based service application and/or cloud-based identity provider in order to obtain the user's cloud-based identity. When queried with the one or more credentials, the cloud-based service application and/or cloud-based identity provider can check that an authentication was made for the credentials. In some embodiments, the cloud-based service application and/or cloud-based identity provider can also check that the authentication was made for the credentials arriving from a particular IP address (e.g., the public IP address of the network gateway, which may be the source of the request to authenticate).

If the configuration request does not include a credential of the visitor, then an indirect indication of the visitor is used by the configuration controller to query the cloud-based service application and/or cloud-based identity provider in order to obtain a cloud-based identity. For example, when queried with an IP address of the network gateway (e.g., public IP address of the network gateway), the cloud-based service application and/or cloud-based identity provider can be configured to determine the authentications performed based on requests from that IP address and a specific port. The most recent of authentications provided for in response to a request from that IP address and port can be considered to be associated with the visitor located nearby the network gateway. Thus, the cloud-based service application and/or cloud-based identity provider can return the cloud-based identity based upon an indirect indication of the user such as the public IP address of the network gateway and a port for which there is an active authenticated connection.

In step 608, a visitor identifier for the network device is generated. In another embodiment, the visitor identifier may be provided by the network gateway, for example, by including it in the configuration request. In some embodiments, the visitor identifier is a pseudo-anonymous identifier. When generated as a pseudo-anonymous identifier, there is nothing in the visitor identifier with which the visitor can be directly identified. For example, the visitor identifier may be a randomly generated number.

In step 610, a relationship between the visitor and the owner is determined. The relationship can be determined between the visitor's cloud-based identity and the owner's cloud-based identity. According to an embodiment, the visitor's cloud-based identity and the owner's cloud-based identity are available in the social-aware cloud-based network device control module 400 and/or configuration database 402. A social application, such as social application 130, may be accessed to determine the relationship between the visitor and the owner of the network gateway. According to an embodiment, the social application may provide a query interface through which the relationship can be determined. In other embodiments, the relationship can be determined by parsing the relationships of either or both the visitor and the owner.

In step 612, the access allowed to the visitor is determined. According to an embodiment, the allowed access is determined based upon the relationship between the owner of the network gateway and the visitor. The access determination may involve a determination as to what network resources are permitted to be accessed by the visitor, whether the visitor can access one or both of the remote network or local network, a level of quality of service to be allowed to the user, and the like. According to an embodiment, profiles preconfigured by the owner or by other means may specify levels of access and quality of service for various relationship categories. For example, family members of the owner may be assigned a level of access in which they can access any of the networked resources, personal friends may be allowed to access printers on the home network and connect to the internet, and acquaintances and unknown visitors may be allowed only access to the internet. Other configurations, such as privileges to upload and/or download files, use streaming multimedia content, and the like may also be configured for visitors. The configurations may be specified at the level of the individual visitor and/or relationship category. According to an embodiment, when a relationship between the visitor and the owner of the network gateway is identified, the network gateway may be configured to provide the visitor with a level of access according to a predetermined profile corresponding to the identified relationship category. The owner may then further configure the access provided to the visitor in order to provide more or less access privileges and/or quality of service to that visitor.

In step 614, one or more instructions are formed to configure access to visitors in the network gateway. The configuration may comprise providing access to the MAC address associated with the visitor, such as, the MAC address of visitor client device 104 associated with visitor 102. The configuration may further comprise one or more firewall rules and/or other access control rules associating the MAC address of visitor client device 104 with selected features, access privileges, and/or access restrictions. Configurations for a visitor may include a maximum level of bandwidth to the user or MAC address associated with the visitor, whether the specified maximum level of bandwidth is to be enforced at all times or only at times when there is no excess bandwidth in the network gateway, a minimum level of bandwidth to be provided, whether to enable logging or monitoring of the MAC addresses associated with the visitor, whether to require periodic user authentication, whether multiple users or multiple source IP addresses are allowed from the same MAC address associated with the visitor, networks or network locations to which access is allowed, networks or network locations to which access is disallowed, access to local network resources, and the like.

In step 616, the cloud-based configuration controller transmits the one or more configuration instructions to the network gateway in order to cause the network gateway to reconfigure itself based upon the transmitted one or more configuration instructions. The transmission of the configuration instructions and/or profile may be encrypted and/or in a secure tunnel formed between the network gateway and the configuration controller. The encryption and/or the secure tunnel can be implemented using one of many techniques. According to an embodiment, the cloud-based configuration controller encrypts the configuration being sent to the network gateway. The encryption may be based on a preconfigured key or a public key associated with the network gateway device.

In step 618, the network gateway configuration can be confirmed by the cloud-based configuration controller. For example, a message may be received from the network gateway indicating the configuration status. If the configuration is successful method 600 ends. If the configuration is unsuccessful, the configuration controller may optionally retry the transmission of the configuration instructions.

Figure 7:
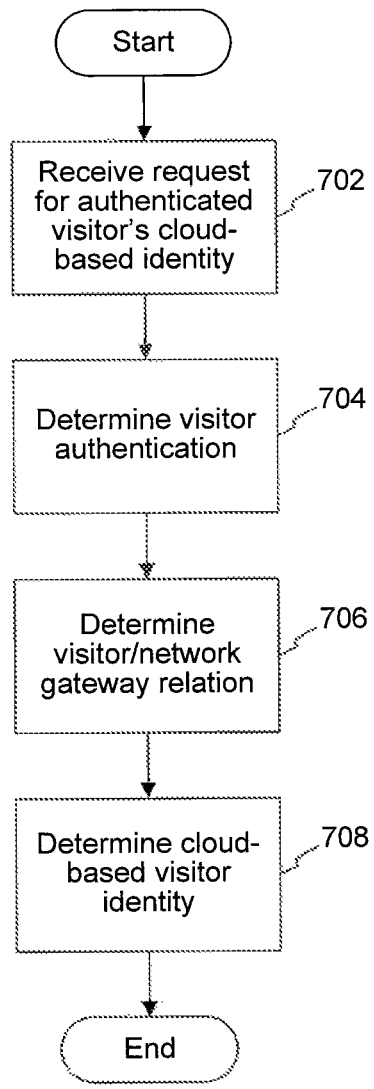
FIG. 7 illustrates a flowchart of a method of determining an authenticated cloud-based identity for a user in accordance with an embodiment.

FIG. 7 illustrates a flowchart of a method 700 (steps 702-708) of determining an authenticated cloud-based identity for a visitor in accordance with an embodiment. According to an embodiment, method 700 can be implemented by one or more of cloud-based service application 106, cloud-based identity provider 108 and cloud-based configuration controller 120 illustrated in FIG. 1. Method 700 may not occur in the order shown, or require all of the steps.

In step 702, a request for an authenticated cloud-based identity of a visitor is received. According to an embodiment, cloud-based configuration controller 120, upon receiving a configuration request from network gateway 110, requests for an authenticated cloud-based identity of a visitor from a cloud-based service application 106 or cloud-based identity provider 108. According to another embodiment, the network gateway can make the request for the visitor's authenticated cloud-based identity from one or more of cloud-based service application 106, cloud-based identity provider 108 and cloud-based configuration controller 120. The request may include a credential of the visitor such as a user name.

In step 704, an authentication of the visitor is determined. According to an embodiment, one or more credentials of the visitor (e.g., username, password, public key, and shared key) or other indicator of the visitor such as an IP address and port from which the visitor would have logged in, is used to locate a previously performed authentication of the visitor. The authentication of the visitor, for example, may have occurred when the visitor accessed a cloud-based service application.

In step 706, it is determined whether the network gateway (i.e., the network gateway that is to be configured) is an intermediary between the visitor and the cloud-based service for which authentication was sought. The intermediary relationship between the visitor and the network gateway can be determined based upon detecting that the public IP address of the network gateway is the same as the public IP address from which the authentication of the user was requested.

In step 708, the cloud-based identity of the visitor is determined. The determined cloud-based identity is found based upon a detected successful authentication of the visitor. The determined cloud-based identity of the visitor is considered an authenticated cloud-based identity because, for example, it is found based upon a detected authentication of the visitor.

Figure 8:
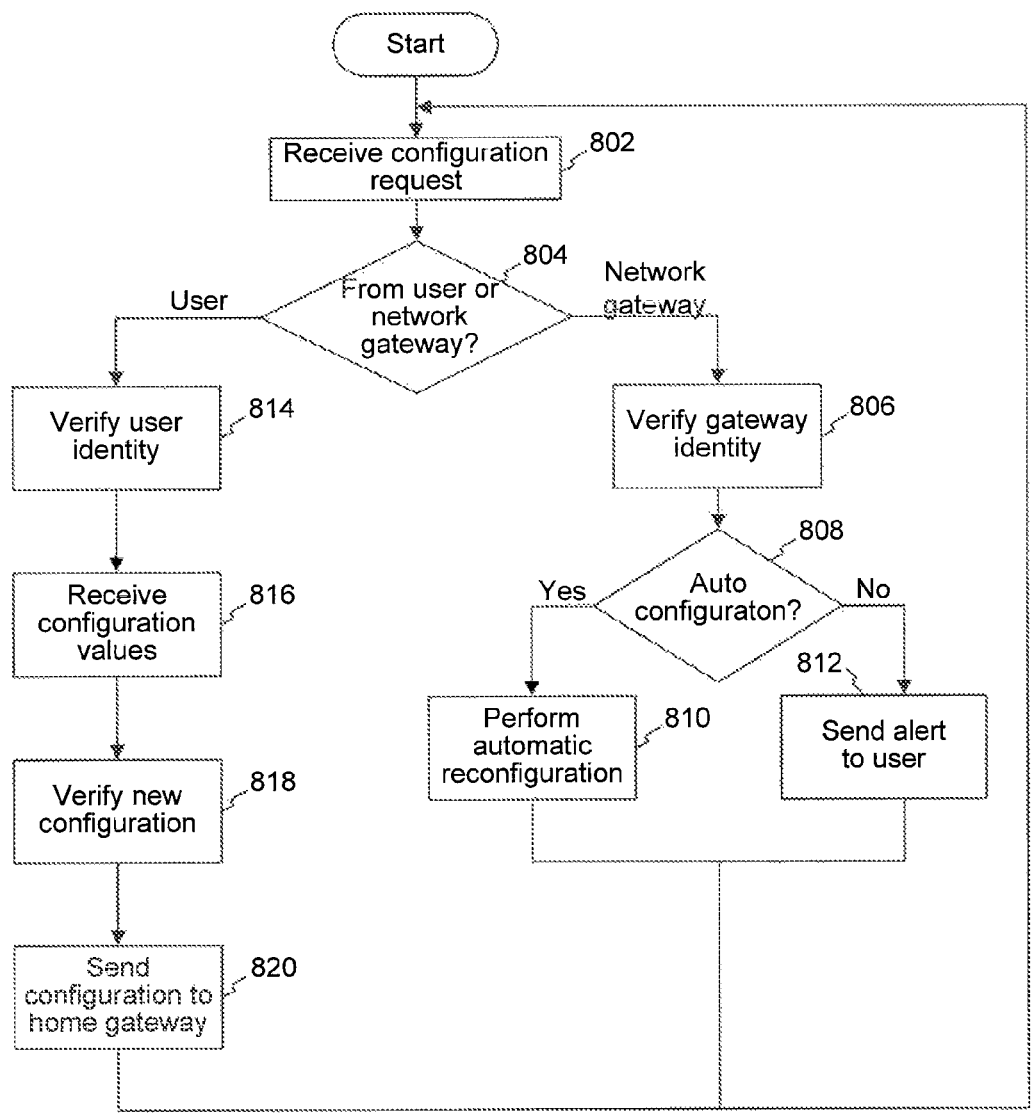
FIG. 8 illustrates a flowchart of a method of configuring a network device through a cloud-based configuration controller in accordance with an embodiment.

FIG. 8 illustrates a flowchart of a method 800 (steps 802-820) of configuring a network gateway through a cloud-based configuration controller in accordance with an embodiment. According to an embodiment, method 800 is used to configure network gateway 110 to provide access to visitors. Method 800 may not occur in the order shown, or require all of the steps.

In step 802 a cloud-based configuration controller, such as cloud-based configuration controller 120, receives a request for visitor configuration. The visitor configuration request indicates that the network gateway requires a configuration with respect to an identified visitor. Information pertaining to an authentication of the visitor by a cloud-based service and/or one or more credentials of the user that can be used to identify an authenticated cloud-based identity of the user may be included in the configuration request.

In step 804, it is determined whether the request was sent by an owner (or other privileged user) or by the network gateway.

If, as determined in step 804, the request is from the network gateway, then method 800 proceeds to step 806. In step 806, the identity of the network gateway can be verified.

In step 808, it is determined whether the requested configuration can be accomplished without owner (or other privileged user) intervention. For example, a request for visitor access privileges for a visitor for whom one or more relationships with the owner can be clearly ascertained may be performed without owner (or other privileged user) intervention by transmitting one more configuration instructions determined by the cloud-based configuration controller. The configuration instructions may be based upon a configuration profile associated with the user, where the configuration profile specifies certain configurations for the determined relationship or relationship category.

If, in step 808, it is determined that no user intervention is required, then in step 810, the one or more instructions to perform the requested configuration of the network gateway are formed and transmitted to the network gateway in order for it to be reconfigured accordingly to provide the requested visitor access.

If, in step 808, it is determined that user intervention is required, then in step 812, the owner (or other privileged user) is alerted. An exemplary method of alert may be to transmit an email message or a text message to an address associated with the cloud-based identity of the owner or the other privileged user. The owner may then login to the network gateway or an interface (e.g., a web-based interface) provided by cloud-based configuration controller 120 to configure and/or control the network gateway.

If, in step 804, it is determined that the request for configuration was received from an owner or other privileged user, then method 800 proceeds to step 814. The configuration request may be received from a user, for example, when a privileged user attempts to reconfigure the network device by logging into the device locally or through a cloud-based configuration controller.

In step 814, the user (e.g., owner or other privileged user) who originated the configuration request is authenticated. According to an embodiment, the cloud-based configuration controller authenticates the user and finds the current configuration that is associated with the network gateway and the authenticated cloud-based identity of the user.

In step 816, configuration information and/or changes to current configurations are received from the user. According to an embodiment, the user may be presented with a user interface in which to make any changes to the current configurations. The changes to the current configuration can include a change to a visitor configuration. For example, changes may be made to the networks or network resources to which a visitor is granted access or to which a visitor is prevented access, and changes may be made to a minimum or maximum bandwidth to be provided to the user.

In step 818, the configuration requested by the privileged user can be verified. For example, the new configuration can be verified by comparing to various standard configurations in order to reduce the risk of misconfiguration.

In step 820, one or more configuration instructions to effect the requested changes are formed, and transmitted to the network gateway. As described above, the configuration may be securely transmitted from the cloud-based configuration controller to the network gateway.

The embodiments have been described above with the aid of functional building blocks illustrating the embodiment of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described illustrative embodiments, but should be defined only in accordance with the following claims and their equivalents.

What is claimed is:

1. A method of configuring a wireless local area network gateway, comprising:
    operating the wireless local area network gateway to provide, to a visitor, a first level of access to a network, the first level of access including an interface to a client device of the visitor;
    identifying a cloud-based identity of the visitor by:
        detecting a presence of the visitor nearby to the wireless local area network gateway, wherein the presence of the visitor is detected over a downlink interface of the wireless local area network gateway;
        monitoring communications originating from the visitor to at least one predetermined cloud-based destination; and
        detecting an authentication of the visitor in packets entering the wireless local area network gateway for a connection to any of the at least one predetermined cloud-based destinations;
    determining at least one relationship between the visitor and an owner of a user account on the wireless local area network gateway, wherein the at least one relationship is determined between a cloud-based identity of the visitor and a cloud-based identity of the owner of the user account on the wireless local area network gateway; and
    reconfiguring the wireless local area network gateway to provide a second level of access to the network to the visitor, wherein the second level of access is based upon the determined at least one relationship, and wherein the second level of access is different between at least two relationship categories of relationships to the owner, the relationship categories comprising a family member, a personal friend, an acquaintance, and an unknown person, the reconfiguring comprising:
        finding, in a configuration profile of the wireless local area network gateway, a configuration setting corresponding to a category of the at least one relationship; and
        associating the cloud-based identity of the visitor with the configuration setting.

2. The method of claim 1, wherein the determining at least one relationship further comprises:
    detecting the at least one relationship between the cloud-based identity of the visitor and the cloud-based identity of the owner of the user account on the wireless local area network gateway in at least one cloud-based service.

3. The method of claim 1, wherein the determining at least one relationship comprises:
    receiving a configuration request from the wireless local area network gateway, wherein the configuration request includes access information pertaining to an access made by the visitor to a cloud-based service; and
    determining the cloud-based identity of the visitor based upon the received access information.

4. The method of claim 3, wherein the determining the cloud-based identity of the visitor comprises:
    determining that the visitor accessed the cloud-based service through the wireless local area network gateway; and
    obtaining the cloud-based identity of the visitor from a cloud-based identity provider associated with the cloud-based service.

5. The method of claim 1, wherein the reconfiguring the wireless local area network gateway further comprises:
    identifying a client device through which the visitor is connected to the network gateway;
    generating a configuration instruction for the wireless local area network gateway to activate the configuration setting for the client device; and
    transmitting the configuration instruction to the wireless local area network gateway.

6. The method of claim 1, wherein the operating the wireless local area network gateway comprises:
    detecting an access to the wireless local area network gateway by a client device, wherein the client device is unrecognized by the wireless local area network gateway; and
    determining the first level of access to the network as a default access level for unrecognized client devices.

7. The method of claim 6, wherein the first level of access to the wireless local area network includes access to at least one cloud-based service that requires authentication.

8. The method of claim 1, wherein the reconfiguring comprises:
    configuring a quality of service level to be provided to the visitor, wherein the quality of service level is determined based upon the at least one relationship, the at least one relationship comprising whether or not the visitor is a privileged user with access to perform administrative operations on the wireless local area network gateway.

9. The method of claim 1, wherein the reconfiguring comprises:
configuring access for the visitor to selected device resources to the network,
wherein the selected device resources are determined based upon the at least one relationship.

10. The method of claim 1, wherein the reconfiguring comprises:
configuring access conditions for the visitor, wherein the configured access conditions are determined based upon the at least one relationship;
identifying a client device through which the visitor is connected to the wireless local area network gateway; and
configuring second access conditions for any other user connecting to the wireless local area network gateway through the identified client device.

11. A wireless local area network device, comprising:
a processor;
a downlink network interface communicatively coupled to the processor and configured to access a home network;
an uplink network interface communicatively coupled to the processor and configured to directly or indirectly access a remote network;
a visitor detection module configured to be executed by the processor and to detect an access by a visitor through the wireless local area network device to a cloud-based service; and
one or more configuration modules configured to be executed by the processor and to configure the wireless local area network device to provide network access to the visitor, wherein a level of access provided to the visitor is different between at least two relationship categories of relationships to an owner of the wireless local area network device, the relationship categories comprising a family member, a personal friend, an acquaintance, and an unknown person,
wherein the wireless local area network device is configured based upon instructions received from a cloud-based configuration controller, and wherein the instructions are responsive to the detected access, the configuring the wireless local area network device comprising:
finding, in a configuration profile of the wireless local area network device, a configuration setting corresponding to a category of a relationship between the visitor and an owner of the wireless local area network device;
associating the cloud-based identity of the visitor with the configuration setting; identifying a client device through which the visitor is connected to the wireless local area network device;
generating a configuration instruction for the wireless local area network device to activate the configuration setting for the client device; and
transmitting the configuration instruction to the wireless local area network device.

12. The network device of claim 11, wherein the visitor detection module is further configured to detect a presence of the visitor nearby the wireless local area network device, wherein the presence of the visitor is detected over at least one downlink interface of the wireless local area network device.

13. The network device of claim 11, wherein the one or more configuration modules are further configured to:

associate a cloud-based identity of the visitor with a pseudo-anonymous visitor identifier; and
set a visitor configuration based upon the associated pseudo-anonymous visitor identifier.

14. A computer program product comprising a non-transitory computer readable medium having computer program logic recorded thereon that, when executed by a processor, enables the processor to configure a wireless local area network device, said computer program logic comprising:
a first logic module to detect an access by a visitor through the wireless local area network device to a cloud-based service; and
a second logic module to configure the wireless local area network device to provide services to the visitor, wherein the wireless local area network device is configured based upon instructions received from a cloud-based configuration controller, and wherein the instructions are responsive to the detected access and a relationship between the visitor and an owner of the wireless local area network device, wherein a level of services provided to the visitor is different between at least two relationship categories of relationships to the owner, the relationship categories comprising a family member, a personal friend, an acquaintance, and an unknown person, the configuring the wireless local area network device comprising:
finding, in a configuration profile of the wireless local area network device, a configuration setting corresponding to a category of the at least one relationship;
associating the cloud-based identity of the visitor with the configuration setting; identifying a client device through which the visitor is connected to the wireless local area network device;
generating a configuration instruction for the wireless local area network device to activate the configuration setting for the client device; and
transmitting the configuration instruction to the wireless local area network device.

15. A system for configuring a wireless local area network device, comprising:
a cloud-based configuration controller including:
a processor;
a visitor configuration request receiving module executed by the processor and configured to receive a visitor configuration request from a wireless local area network device, wherein the visitor configuration request includes access information pertaining to an access made by a visitor to a cloud-based service;
a visitor identity module executed by the processor and configured to:
determine a cloud-based identity of the visitor based upon the received access information by:
detecting a presence of the visitor nearby to the wireless local area network gateway, wherein the presence of the visitor is detected over a downlink interface of the wireless local area network gateway;
monitoring communications originating from the visitor to at least one predetermined cloud-based destination; and
detecting an authentication of the visitor in packets entering the wireless local area network gateway for a connection to any of the at least one predetermined cloud-based destinations;
find, in a configuration profile of the wireless local area network gateway, a configuration setting corresponding to a category of the at least one relationship; and associate the determined cloud-based identity of the visitor with a visitor identity configuration; and a visitor configuration generation module executed by the processor and configured to form one or more instructions to configure the wireless local area network device to provide access to the visitor based upon the visitor identity configuration, wherein a level of access provided to the visitor is different between at least two relationship categories of visitor relationships to an owner of the wireless local area network device, the relationship categories comprising a family member, a personal friend, an acquaintance, and an unknown person.

16. The system of claim 15, wherein the cloud-based configuration controller further comprising:

a pseudo-anonymous visitor identity module executed by the processor and configured to:

generate a pseudo-anonymous visitor identifier; and associate the pseudo-anonymous visitor identifier with the cloud-based identity of the visitor and with the visitor identity configuration.

17. A computer program product comprising a non-transitory computer readable medium having computer program logic recorded thereon that, when executed by a processor, enables the processor to configure a wireless local area network device, said computer program logic comprising:

a first logic module configured to receive a visitor configuration request from the wireless local area network device, wherein the visitor configuration request includes access information pertaining to an access made by a visitor to a cloud-based service;

a second logic module configured to determine a cloud-based identity of the visitor based upon the received access information;

a third logic module configured to determine the cloud-based identity of the visitor based upon the received access information, and to associate the cloud-based identity with a visitor identity configuration; and a fourth logic module configured to form one or more instructions to configure the wireless local area network device to provide access to the visitor based upon the visitor identity configuration, wherein a level of access provided to the visitor is different between at least two visitor relationship categories of relationships to an owner of the wireless local area network device, the relationship categories, the visitor relationship categories comprising a family member, a personal friend, an acquaintance, and an unknown person, the configuring the wireless local area network device comprising:

finding, in a configuration profile of the wireless local area network device, a configuration setting corresponding to a category of a relationship between the visitor and an owner of the wireless local area network device;

associating the cloud-based identity of the visitor with the configuration setting; identifying a client device through which the visitor is connected to the wireless local area network device;

generating a configuration instruction for the wireless local area network device to activate the configuration setting for the client device; and transmitting the configuration instruction to the wireless local area network device.

* * * * *